United States Patent

Sorensen

Patent Number: 5,411,239
Date of Patent: May 2, 1995

[54] VALVE ACTUATOR

[75] Inventor: Erling A. Sorensen, Searook, Tex.

[73] Assignee: Delta-P Engineering, Inc., Texas City, Tex.

[21] Appl. No.: 1,309

[22] Filed: Jan. 6, 1993

[51] Int. Cl.⁶ .................................. F16K 31/163
[52] U.S. Cl. ...................... 251/58; 251/229; 251/233; 251/255
[58] Field of Search ............... 251/58, 229, 233, 234, 251/254, 255

[56] References Cited

U.S. PATENT DOCUMENTS

| | | |
|---|---|---|
| 3,082,782 | 3/1963 | Schuder . |
| 3,508,567 | 4/1970 | Kirk et al. ............... 251/234 X |
| 3,608,862 | 9/1971 | Paxton ....................... 251/229 |
| 4,050,670 | 9/1977 | Borg et al. ................ 251/58 X |
| 4,237,925 | 12/1980 | Urushida .................... 137/607 X |
| 4,467,834 | 8/1984 | Rochat et al. ............. 137/607 X |
| 4,545,560 | 10/1985 | Marcadet et al. ........... 251/58 |
| 4,700,735 | 10/1987 | Hamernik et al. .......... 251/58 X |

Primary Examiner—Stephen M. Hepperle
Attorney, Agent, or Firm—Arnold, White & Durkee

[57] ABSTRACT

A control valve having a pneumatic actuator and positioner to move the stem of a globe-type valve. The actuator has a spring-opposed piston that moves a chassis including a cam with an inclined plane. The inclination of the cam plane can be varied to precisely displace the valve stem. The amount of displacement selected, together with a specific valve plug contour, yield a specific maximum flow coefficient of the valve at that setting. The setting can be changed to accommodate moderate to very low fluid flows. A numerical display on the actuator may be used to register the flow coefficient selected.

13 Claims, 4 Drawing Sheets

VALVE ACTUATOR

BACKGROUND OF THE INVENTION

The present invention relates to flow control valves. The invention more particularly concerns flow control valves which are adjustable in their ability to control various ranges of flow rates. The invention is especially directed at multiple flow range control valves whose ranges of flow rates may be changed without substantial replacement of the valves or valve parts.

The reciprocating element in a valve is commonly called a valve plug. By precisely controlling the position of the valve plug, the flow of fluid through the valve can be controlled. Thus, the parameters of a process or other operation may be maintained at a desired condition by precise modulating motion of the valve plug.

In general, mechanical regulating devices used for controlling the motion of a valve plug are composed of two devices a power device to produce the required force and motion, and a servomotor which controls the position of the power device. Valve positioners are a common form of servomotors.

Valve positioners are designed and constructed to respond to a command signal of some low level, and to provide an output of compressed air which causes movement of the power device. There is a feedback means between the power device and the positioner. The motion of the power device will cease when the feedback signal (or motion) has reached a level that corresponds to the command signal sent to the positioner.

The command signal to the positioner is the signal that results from one or more sensing or analyzing devices that are constantly monitoring process parameters in the fluids flowing through valves, piping or vessels. When there is a deviation from the desired parametric condition, the resultant signal to the positioner will cause the control valve to change the flow through the valve, thereby re-establishing the desired condition. The fluid conditions may have small deviations requiring small changes in flow, thus, requiring small precise movements of the power device.

In a process where a control valve is required, a computation that includes all process variables will typically disclose minimum, normal and maximum flow requirements of the valve. The flow requirement is expressed as Cv for each condition respectively. The term Cv is a unitless number that represents the flow coefficient of a valve. When a valve has a Cv of one, it will flow one U.S. gallon of water per minute when the pressure drop through the valve is one psi. From this basis, a guideline is established for selecting control valves. Thus, the Cv that is calculated as a requirement of a given process can be compared to published Cv values of various valves and an appropriate selection can be made.

The resulting control valve selection is normally based on the best possible valve to meet desired parametric conditions. When one or more process parameters change, a new computation may disclose that a valve with a higher or lower flow coefficient is required. In applications involving moderate to low flows, even a modest change in a parameter can create a situation where an existing control valve does not have the necessary range or flow capability to control the new process condition. For example, when the flow capacity of a valve must be increased or decreased, it may be necessary to change the internal components of the valve.

After a valve has been placed in service, it is an encumbrance to the user if he determines that the valve plug and orifice must be changed to provide the appropriate flow or control. Changes require isolating the valve from the process, removal from the process line, disassembly of the valve, selecting the appropriate plug and orifice, installation of the parts, re-assembly of the valve, calibration and pressure testing of the assembly, and reinstallation in the process line. In many chemical processes, this procedure can be costly and hazardous.

Control valves that use a contoured plug operating in conjunction with an orifice will have a rangeability that is typically 50:1. Rangeability is defined as the ratio of the maximum controllable flow to the minimum controllable flow. This may also be expressed as a ratio of the maximum Cv to the minimum Cv.

SUMMARY OF THE INVENTION

The present invention provides means for precisely increasing or decreasing the travel of a valve plug which results in an increased or decreased range of controllable flow. The invention thereby changes the range of a single orifice valve without physically changing the valve plug or the orifice.

With this invention, the need to remove and disassemble a valve is greatly reduced or eliminated. The user merely makes an adjustment of the valve actuator to provide the necessary increase or decrease to the Cv of the valve. This adjustment may be made in stepless increments in contrast to the stepped increments associated with change-outs of valve plugs and orifices. The invention, for example, may provide a single plug/orifice for a range of flow controls which otherwise could require 15 or more plug/orifice combinations.

The invention relates to a control valve that typically responds to pneumatic signals and uses compressed air or other gases, as a means of actuating a mechanism to provide a desired motion to a variable orifice valve. More particularly, the invention provides a more precise control of flow, from moderate levels of flow to extremely low flows. To control flow, the device uses an adjusting mechanism capable of providing a precise change to the controlled flow range of a single-orifice valve.

The need to change a valve's components is reduced or even eliminated with the improvement provided by this invention. The user of the invention makes a simple adjustment that provides the necessary increase or decrease to the valve's maximum flow capacity. That adjustment may be made at any time without process upsets. Moreover, the user typically does not have to recalibrate the unit after he adjusts it.

When a control valve is required to control extremely low flows, the movement of the valve plug must be controlled with precision. This invention provides such precision by incorporating a mechanism with a very high mechanical advantage. It is important, therefore, that the components which impart motion to the valve plug be precision parts. It is preferred that the precision parts have essentially no lost motion that would otherwise permit random, imprecise movements of the valve plug. One preferred embodiment of this invention uses biasing forces from springs so that an exact motion to the valve plug is predictably imparted, regardless of other random forces, such as friction, that may be introduced by process pressures and seals.

The invention in a general aspect concerns a flow control valve which is capable of controlling not only a broad range of flow rates but also narrower ranges within that broad range. The invention broadly comprises a control mechanism which preferably employs a first component for opening or closing a valve in response to signals indicative of the flow rate through the valve at any given time, plus a second component for adjusting the extent to which the valve may open and close. Thus, the valve may be adjusted by means of the second component to adjust flow rates through the valve over different ranges of flow rates. Moreover, these adjustments may be made without changes-outs of the first control component or the valve or its components.

In a broad embodiment, the apparatus of the invention comprises an actuator having a drive member operable in response to a pneumatic signal to generate movement. A first linkage couples the drive member to the valve to enable the valve to be opened and closed in response to the signal. The invention further comprises a second linkage operable to displace the first linkage relative to the valve while maintaining coupling of the drive member and the valve so as to change the range of openings of the valve in response to the magnitude of the movement.

Thus, in one preferred embodiment, the first linkage comprises a first linear cam adapted to move with the drive member and a first cam follower which is capable of moving the valve stem of the valve in response to the movement of a pneumatically powered piston over a range of piston positions. The second linkage comprises a second linear cam which is operable to move the first linear cam relative to the valve. The position of the second linear cam is adjustable to change the range of openings the valve may take in response to the range of positions the piston may take. The position taken by the piston at any given time is controlled by an analog pneumatic signal from appropriate sensors in response to flow through the valve.

In all applications of process control valves, it is necessary to calculate the required flow capacity of the valve for normal, maximum and minimum flow conditions. Many process variables enter into these computations. The resulting control valve selection is based on the best possible device to meet the desired parametric conditions. When one or more process variables change, a new computation may show that a higher or lower valve capacity is required. In applications involving moderate to low flows, even a modest change in a variable can create a situation where a selected control valve does not have the range or flow capability to control a new process condition. This invention permits the user to make field adjustments to the control valve in accordance with the changed condition(s), and to set the valve to the calculated value of the maximum flow coefficient.

One preferred embodiment of this invention incorporates a numerical display of the flow coefficient of a valve. The numerical display changes as adjustments are made to the valve actuator. As noted earlier, the flow coefficient (or valve coefficient) is expressed as Cv.

The flow capacity, Cv, of the valve is manually adjusted in a preferred embodiment by a gearing mechanism. The gearing mechanism is linked to a counter which displays the selected Cv of the valve. At a selected Cv setting, the valve actuator, in response to appropriate signals, can vary the flow from the maximum selected Cv to no flow. Therefore, the gearing mechanism controls the relationship between the numerical display, the actuator, and the valve plug.

As noted above, a control valve's flow range is preferably set by the angle of a cam. The cam's angle controls the amplitude of motion of a valve plug. When the cam's angle is steep, the valve plug has its greatest amplitude of motion, from fully closed to fully open. Conversely, when the cam's angle is nearly flat, the valve plug will have a smaller amplitude of motion. The amplitude of motion when the cam's angle is nearly flat may be less than one thousandth of an inch.

The gearing mechanism preferably controls the cam's angle in a non-linear fashion. Adjustments when the cam's angle is steep are relatively coarse. However, adjustments when the cam's angle is nearly flat are relatively fine.

The amount of flow through a valve's orifice is preferably controlled in part by the valve plug's contour. The amount of flow will vary from a maximum amount, dependent upon the cam's angle, to zero flow when the valve is closed.

In a preferred aspect, the invention provides an improved control valve actuator that incorporates strong biasing forces on its mechanism so that adverse effects of random, unpredictable forces or the micro-movements of the valve plug are greatly reduced or eliminated.

It is a feature of the invention that it provides an improved control valve actuator mechanism wherein the output motion to a valve plug may be precisely changed, while the input motion to the mechanism remains relatively constant. Thus, the invention provides an improved actuator and valve combination with an adjustable maximum flow coefficient. Preferably, the invention incorporates a numerical display of the control valve's maximum flow coefficient and displays increased or decreased values as adjustments are made to the actuator.

It will be recognized that the invention provides an improved control valve actuator that has a variable mechanical advantage over the motion of a valve plug and provides its greatest mechanical advantage over that valve plug movement when the most precise movements are required. Further, the invention offers a control valve actuator that may be constructed to give fail-open or fail-close action to the control valve without additional parts or compromise in performance.

Other features and advantages of the invention will be apparent to those skilled in valve controls when reading this disclosure.

DESCRIPTION OF THE PREFERRED EMBODIMENT

Figure 1:
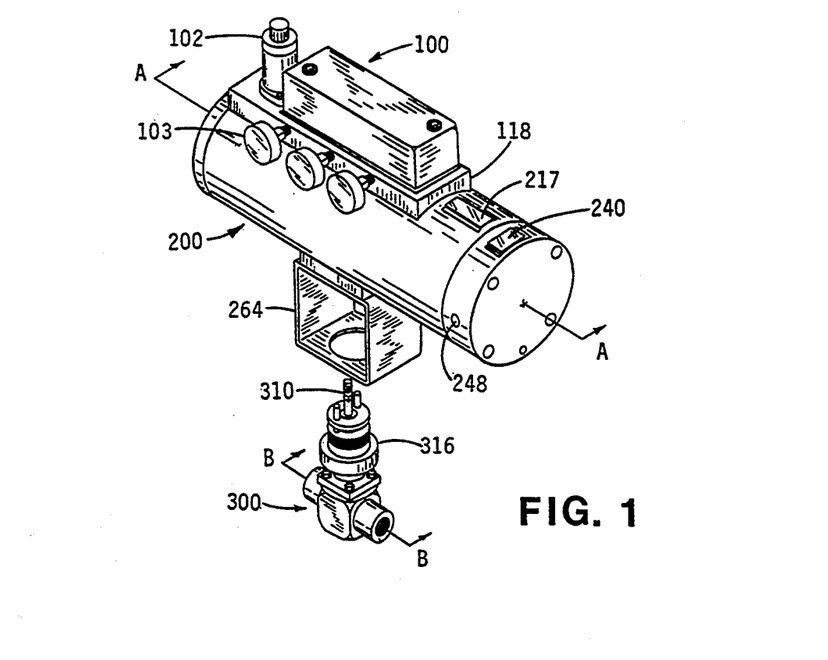
FIG. 1 is an isometric exterior view of a control valve actuator with a control valve disconnected and below the actuator.

FIG. 1 shows a control valve actuated by compressed air. The control valve comprises three major assemblies including a valve positioner 100, a valve actuator 200 and a valve body 300. The valve positioner 100 is the basic controlling element of the assembly.

Preferably, as shown in FIG. 1, the positioner 100 has supply pressure regulator 102. Preferably, the positioner 100 also has a set of three pressure gauges 103 indicating supply pressure to the relay 104, output pressure to the actuator 200 and instrumental signal pressure to the valve positioner 100.

Figure 2:
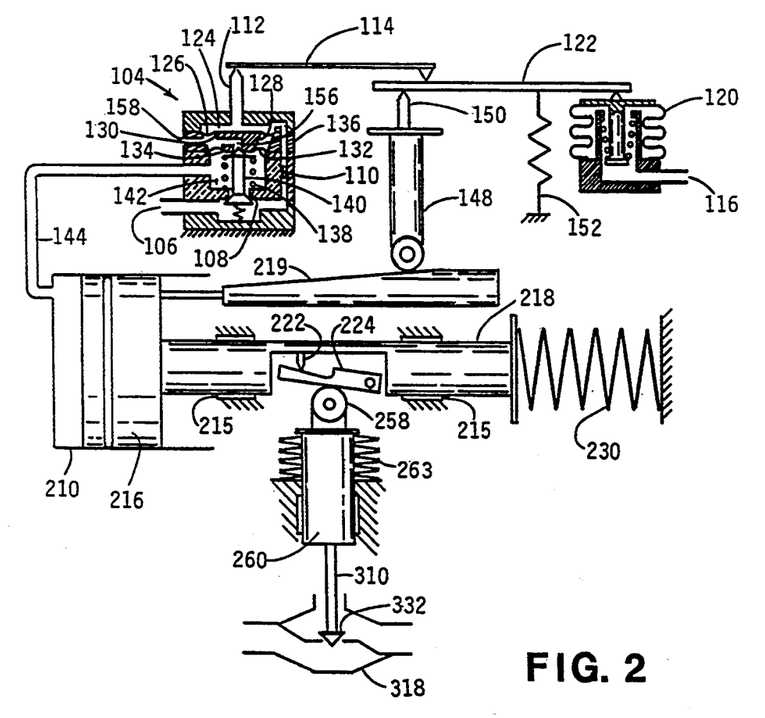
FIG. 2 is a schematic diagram of a valve positioner, actuator and main valve.

FIG. 2 shows a schematic of a direct acting pneumatic valve positioner. Air pressure is supplied from the regulator 102 to the relay 104, through a passageway 106. The passageway 106 leads to the relay supply port 108 and the fixed restriction 110. The diameter of the fixed restriction 110 is less than the diameter of a nozzle 112 so that air can bleed out faster than it is being supplied when a flapper 114 is not restricting the nozzle 112. Preferably, a nozzle 112 having a diameter of 0.037 inches is paired with a fixed restriction 110 of 0.018 inches.

Figure 3:
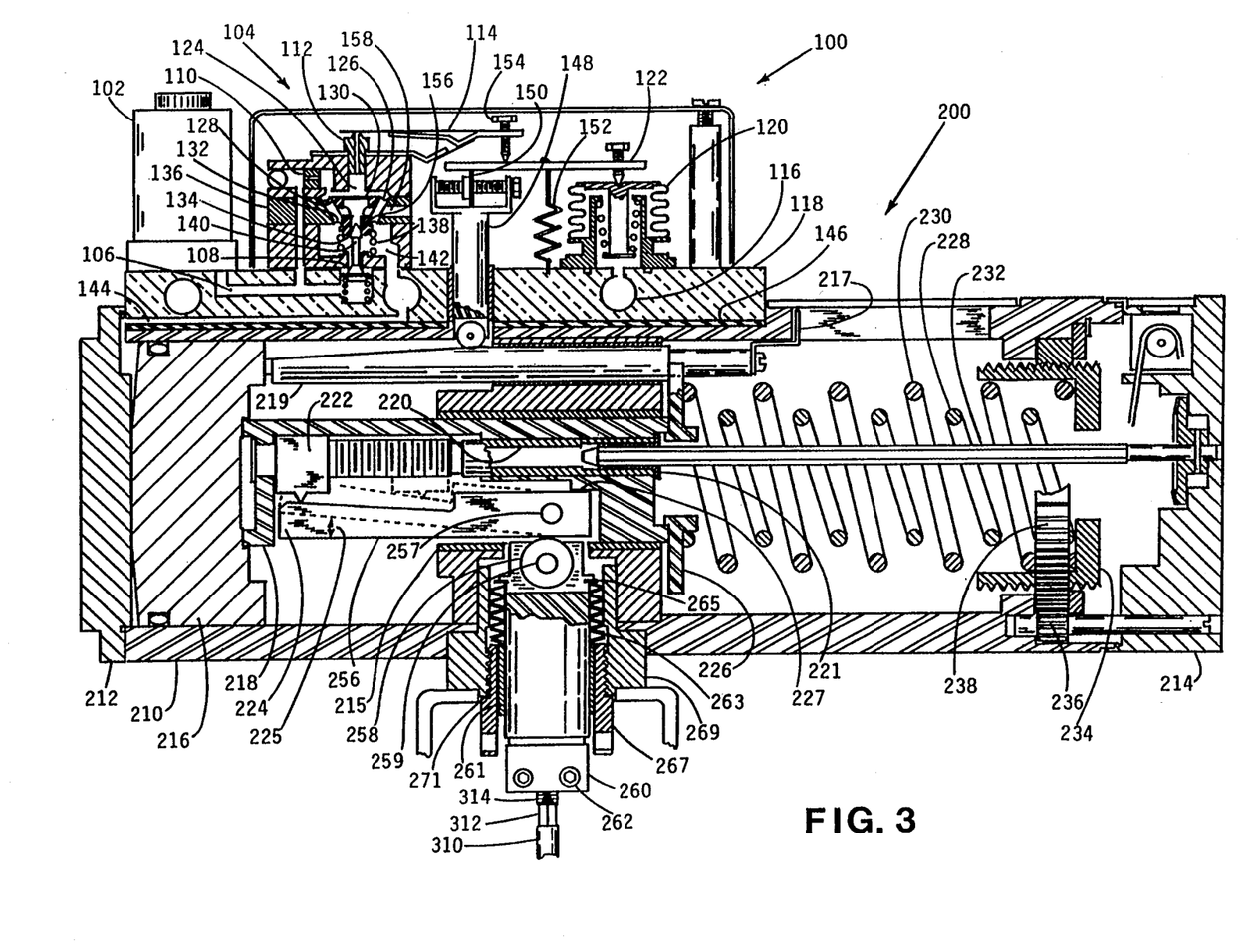
FIG. 3 is a sectional view along the lines A—A of the actuator in FIG. 1 through the entire length of the actuator.

The instrument signal in FIG. 2 and FIG. 3 is transmitted thorough a passageway 116 in a manifold 118, to a bellows 120. When the instrument signal pressure increases, the bellows 120 expand to move a beam 122 causing the flapper 114 to restrict the flow of air through the nozzle 112. The restricting action causes the pressure to increase in the nozzle chamber 124. The increased pressure acts on the area of the nozzle diaphragm 126. The force generated is transmitted to the exhaust section 128 of a diaphragm assembly 130 which consists of an output diaphragm 132, an exhaust seat 134 and an exhaust section assembly 130 overcoming the spring force of a relay spring 138 and causes a relay plug 140 to move slightly downward. This movement allows the flow of supply air through supply port 108 to an output chamber 142 and through a passageway 144 to a cylindrical housing 210. The passageways 106, 116, and 144 are sealed from leaking to the atmosphere by a gasket 146 which is clamped securely between the bottom of the manifold 118 and a flat surface on the top of the cylindrical housing 210. The output pressure from the relay 104 acts on a piston 216 and creates a force that tends to cause motion of the piston 216 from left to right (as shown). The piston 216 force acts on a chassis 218. As the piston 216 moves, it pushes on a position feedback cam 219. The cam surface is sloped and as the cam moves with the displacement of the piston 216, the cam follower assembly 148 moves downward, following the slope. A fulcrum 150 moves downward since it is part of the cam follower assembly 148. The beam 122 rests on the fulcrum 150 and is held firmly in place by a bias spring 152. As the fulcrum 150 moves downward, the beam 122 pivots counter clockwise. A flapper adjusting screw 154 moves downward thereby relieving the force of the flapper 114 against the nozzle 112 and slightly reducing the pressure in the nozzle chamber 124. The supply pressure through relay supply port 108 is shut off as the relay plug 140 closes. The positioner 100 is now in equilibrium with an output pressure that has increased in response to the instrument signal increase and the piston 216 has moved some increment that is proportional to the increment of change of instrument signal.

When the instrument pressure decreases, the bellows 120 contracts. The beam 122 pivots clockwise, and the flapper 114 moves away from the nozzle 112. The pressure in the nozzle chamber 124 reduces and the diaphragm assembly 130 moves upward assisted by the force from the relay spring 138. The exhaust seat 134 moves away from the tip of relay plug 140 and opens the exhaust port 156. The air from the cylindrical housing 210 escapes through the passageway 144, exhaust port 156 and an exhaust hole 158. The piston 216 moves from right to left as the air exhausts, by a biasing force from springs 228 and 230 acting on the chassis 218. The position feedback cam 219 moves from right to left (as shown), following the piston 216. The cam follower 148 and fulcrum 150 move upward causing the beam 122 to pivot clockwise. The flapper adjusting screw 154 moves upward, increasing the force against the nozzle 112 and increasing the pressure in the nozzle chamber 124. The exhaust seat 134 moves to engage the relay plug 140 tip to shut off the exhaust flow. The system again has reached equilibrium.

Preferably, the movements of all of the positioner 100 components are very small and sensitive and provide a precise control of piston 216 position. In a preferred embodiment, the positioner is linear: A change of instrument signal from 3 to 15 psig in equal increments will cause the piston to travel 0 to 100% in equal increments.

FIG. 3 shows a cross-section of the valve actuator 200 along the Line A—A of FIG. 1. The valve positioner 100 comprises the top of the assembly. Underneath the valve positioner 100 is the manifold 118, which is on top of the valve actuator 200.

The valve actuator 200 comprises a cylindrical housing 210 having a first and second end enclosed by end caps 212 and 214, respectively. The first end cap 212 abuts a slider assembly. The slider assembly comprises a piston 216 positioned inside the housing 210 to receive the output pressure signal from the valve positioner 100. The signal travels through passageway 144 of the manifold 118. The output signal forces the piston 216 from the first end cap 212 of the housing 210 to a position nearer the second end cap 214 of the housing 210.

The piston 216 is engaged on its second end by a chassis 218. The chassis 218 is positioned within the housing 210 in sliding contact with a plurality of low friction bushings 215. The chassis 218 is generally co-axial to the axis of the housing 210.

The piston 216 is joined by a position feedback translating cam 219. The feedback cam 219 is positioned above the chassis 218 with the cam's 219 first end joining piston 216. The cam's 219 top surface engages the valve positioner's 100 cam follower assembly 148. A travel scale indicator 217 joins the second end of the cam 219 and is positioned below an aperture in the top of housing 210.

Figure 4:
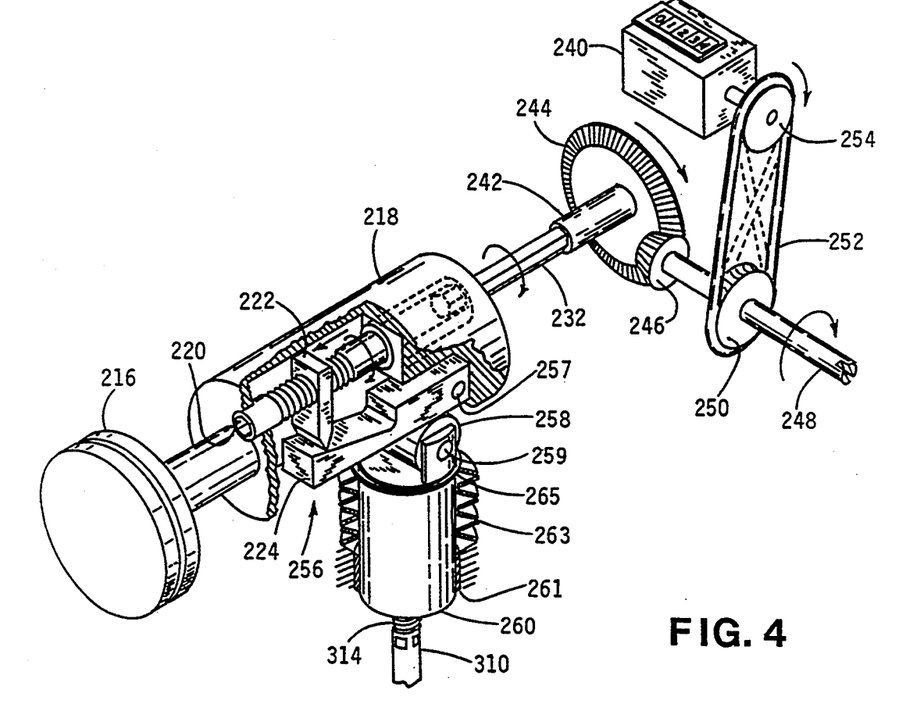
FIG. 4 is a schematic isometric drawing of a cam adjusting mechanism useful with the actuator.

FIG. 4 shows a perspective view of the valve actuator 200 without the housing 210 and shows a cut away view of the chassis 218. The position feedback translating cam 219 is not shown.

A hexagonally hollowed rod section 220 of a telescoping, sectional, adjuster shaft extends coaxially through the chassis 218. Two bushings 221 with female hexagonal apertures are pressed to the hollow section 220 of the adjuster shaft assembly, one at each end of the chassis 218. The bushing 221 allows rotational movement of the adjuster shaft assembly. Within the chassis 218, the outer portion of the hollow section 220 of the adjuster shaft assembly is threaded along its length.

A cam actuator 222 is threaded to move along the threads of the hollow section 220 in response to rotation of the adjuster shaft assembly. The cam actuator 222 engages an upper inclined surface on a sliding cam 224, which is pivotally mounted within the chassis 218. An aperture in the bottom of the chassis 218 exposes the bottom surface of the sliding cam 224. The sliding cam 224 is mounted between the second end of the chassis 218 and the cam actuator 222.

Referring again to FIG. 3, the angle of inclination 225 of sliding cam 224 is shown. Preferably, the sliding cam 224 rotates a maximum of five or six degrees with horizontal being the lower limit. A lip 227 on the second end of chassis 218 engages sliding cam 224 in the horizontal position and limits the sliding cam's 224 rotation below the horizontal.

At the second end of the chassis 218, a spring seat 226 engages an inner biasing helical spring 228 and an outer biasing helical spring 230. The spring force biases the chassis 218 toward the first end cap 212 of the housing 210.

Through an aperture in the spring seat 226, a rod 232 telescopically and coaxially engages the hollow section 220 of the adjuster shaft assembly. The rod 232 preferably is machined in a hexagonal shape to a snug tolerance with the inside of the hollowed hexagonal shape of section 220. The rod 232 runs coaxially through the housing 210 and passes through an aperture in an adjustable second spring seat 234.

The adjustable second spring seat 234 is positioned near the second end cap 214 of the housing 210. Spring seat 234 has a threaded outer perimeter which engages a threaded interior wall of first ring gear 238. This second spring seat 234 may be adjusted by rotating a first pinion gear 236 seated underneath the second spring seat 234. The first pinion gear 236 engages a first ring gear 238. The first ring gear 238 joins the outer perimeter of the second spring seat 234.

By adjusting the position of the second spring seat 234, the spring's compression 228 and 230 can be adjusted from zero to a desired pre-load condition. With a pre-load condition, the output signal from the valve positioner 100 to the piston 216 must reach a desired value before the piston 216 moves from the zero-travel position. This pre-load condition provides a residual force so that the chassis 218 and piston 216 will always go to the zero-travel position when the air supply is shut off or fails. This pre-load condition is called fail-close.

Between the second spring seat 234 and the second end cap 214 is a gearing mechanism for fine tuning the valve actuator. FIG. 4 shows a view of the valve actuator 200 without the housing 210. This view includes the gearing mechanism. Gearing mechanisms are well known in the art and will not be described in detail in the specification.

Preferably, the gearing mechanism will control the angle 225 of the sliding cam 224 and display of a counter 240, which numerically displays the selected Cv setting of the valve actuator 200.

A hub 242 on a second ring gear 244 of the gearing mechanism engages the rod 232. A second pinion gear 246 engages the second ring gear 244 of the gearing mechanism. The pinion gear shaft 248 has a pulley 250 surrounded by a belt 252, which connects to a pulley 254 on the counter. Through this connection, rotation of the gearing mechanism by means of pinion shaft 248 rotates the numerical display of the counter 240. Rotation of the pinion shaft 248 also adjusts the cam actuator which limits the angle of the exposed bottom cam surface 256 of the sliding cam 224.

A roller cam follower 258 engages the exposed bottom cam surface 256. The cam surface 256 of the horizontally oscillating sliding cam 224 directs the vertical oscillation of the roller cam follower 258.

FIG. 3 shows the roller cam follower 258 reaching the lower extreme of its vertical oscillation as the sliding cam's pivot pin 257 reaches a point directly above the centerline of roller cam follower 258. This position defines the extreme of the sliding cam's 224 oscillation.

The roller cam follower 258 is within the housing 210 directly above an aperture in the bottom of the housing 210. The roller cam's roller axis is disposed transversely to the length of the housing 210. The roller cam follower 258 is mounted on a shaft 259 which engages a clevis top of a valve connector assembly 260.

The valve connecter assembly 260 is slidably positioned within the opening in the bottom of the housing 210. A bushing 261 pressed into a spring retainer 267 is in sliding contact with the valve connector assembly 260. The valve connector assembly 260 is biased by a spring 263 to retain the roller cam follower 258 against the lower cam surface 256 of the sliding cam 224. Spring 263 is positioned between a spring seat 265 on the valve connector assembly 260 and a spring retainer 267 which threadedly engages a threaded yoke adapter 269. The yoke adapter 269 is positioned in the aperture of the housing 210. Spring retainer 267 is threaded into the yoke adapter 269 to engage a shoulder 271.

The lower end of the valve connector assembly 260 connects to the valve stem 310. Four flats 312 on the valve stem 310 are used to turn the stem threads 314 (see FIG. 5) into a threaded section of the valve connector 260. Two clamp screws 262 securely clamp the stem connector 260 to the stem 310. The lower end of valve stem 310 is housed in the main valve assembly 300.

Referring again to FIG. 1, an exploded view of the main valve assembly 300 underneath the valve actuator 200 is shown. A bonnet 316 on top of the main valve assembly 300 connects to the yoke 264 (see FIG. 1) underneath the yoke adapter 269 (see FIG. 3). The yoke 264 engages the bonnet 316 and aligns the valve stem 310 of the main valve assembly 300 coaxially with the valve connector assembly 260.

Figure 5:
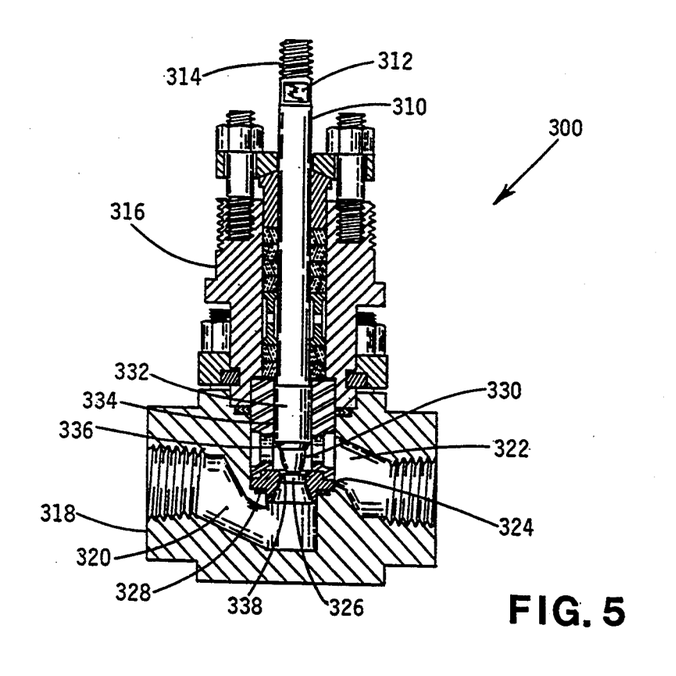
FIG. 5 is a sectional view taken along the lines B—B of the valve in FIG. 1.

FIG. 5 shows the main valve assembly 300. The valve assembly 300 may be of any suitable construction, pressure rating or material.

The main valve assembly 300 includes a valve body 318 having communicating ports 320 and 322. The communicating ports 320 and 322 are on opposite ends of the valve body 318 and are threaded for connection to external pipes. (External pipes are not shown.) A seat ring 324 having a seat ring port 326 is between communicating ports 320 and 322. A gasket 328 forms a seal between the valve body 318 and the lower face of the seat ring 324. A valve plug guide 334 above the seat ring aligns a valve plug 332 coaxially with the seat ring port 326. Communicating ports 320 and 322 have a cross-sectional area that is at least one and one half times greater than the area of seat ring port 326.

Seat ring port 326 is of sufficient size to accommodate the valve plug contour 330 of valve plug 332. The valve plug 332 has a guide 334 to align it coaxially with the seat ring port 326. It should be noted that the seat ring port 326 must also accommodate the Cv capability, i.e. capacity for the flow requirement of the valve assembly 300.

The bottom of valve stem 310 may be integral with or attached to a valve plug contour 330. The valve plug contour 330 provides an annular flow area that produces a certain maximum Cv or flow capability that substantially matches the Cv that is displayed by the numerical counter 240 in the gearing mechanism. Flow through the port 326 starts when the valve plug 332 is displaced some increment from the shut off position.

The valve plug contour 330 provides a control of flow from a maximum condition when the valve plug 332 is at 100% displacement to zero flow. Zero flow is achieved when a beveled seat 336 above the valve plug contour 330 engages an opposing beveled seat 338. Preferably, the opposing beveled seats 336 and 338 are of nearly the same angle.

A proportionality exists between the flow past the valve plug contour 330 and the annular flow area that is exposed when the beveled seats 336 and 338 are displaced some increment from the shut off position. This area may be calculated for many successive increments of valve plug 332 displacement. A contour 330 can be established from the calculated data.

The contour 330 should be considered a theoretical shape until flow tests have been conducted. The geometry of the contour 330 and the configuration of beveled seats 336 and 338 can then be altered from empirical data. The geometry is altered to produce the desired flow for incremental displacement of valve plug 332 that coincide substantially with the numerically displayed Cv on the counter 240.

The shape of the seat ring port 326 also influences the flow capability of the plug contour 330. The results of flow tests are more consistent when the port 326 has a tapered transition from a larger diameter at the bottom of the seat ring 324 to the smallest diameter calculated for a desired Cv.

Referring again to FIG. 3, the piston 216 is shown in position against the end cap 212. The position of the valve plug 332 (not shown) is adjusted relative to the seat ring 324 (not shown) when the piston 216 and chassis 218 are in this position. This can be done by adjusting the stem 310 engagement in the stem connector 260 until the beveled seating surfaces 336 and 338 (not shown) are firmly engaged. The clamp screws 262 are then secured to maintain the adjustment.

The valve actuator 200 in FIG. 3 is designed to provide a discrete position of the piston 216 if there is a loss or interruption of air supply. Upon a failure of the air supply, the springs 228 and 230 provide the force necessary for the piston 216 and the chassis 218 to move as one unit, from right to left, until the piston 216 engages the end cap 212 and comes to a stop. The sliding cam 224 exerts a force on the roller cam follower 258 and forces the stem connector assembly 260 downward to the most extreme position. The stem 310 is forced downward and the valve plug 332 will shut off the flow of fluid through the port 326. This is the fail-close mode of failure.

FIG. 4 can be used to illustrate that the valve actuator 200 may be reconstructed to provide a fail-open mode of failure. The chassis 218 must be turned end-for-end so that the pivot pin 257 is closest to the piston 216. The reversing of the chassis 218 requires resetting the engagement of the stem 310 in the stem connector 260 while the chassis is traveled 100%. Also, the belt 252 must be removed from the pulley 250 in the gearing mechanism, twisted to form a figure eight and reinstalled on the pulley 258. With the chassis reversed and the belt 252 as a figure eight, adjustments made to the pinion shaft 248 provide the same increments of change described in previous paragraphs, and the values displayed on the numerical counter 240 will be consistent with the maximum Cv of the valve 318.

Figure 6:
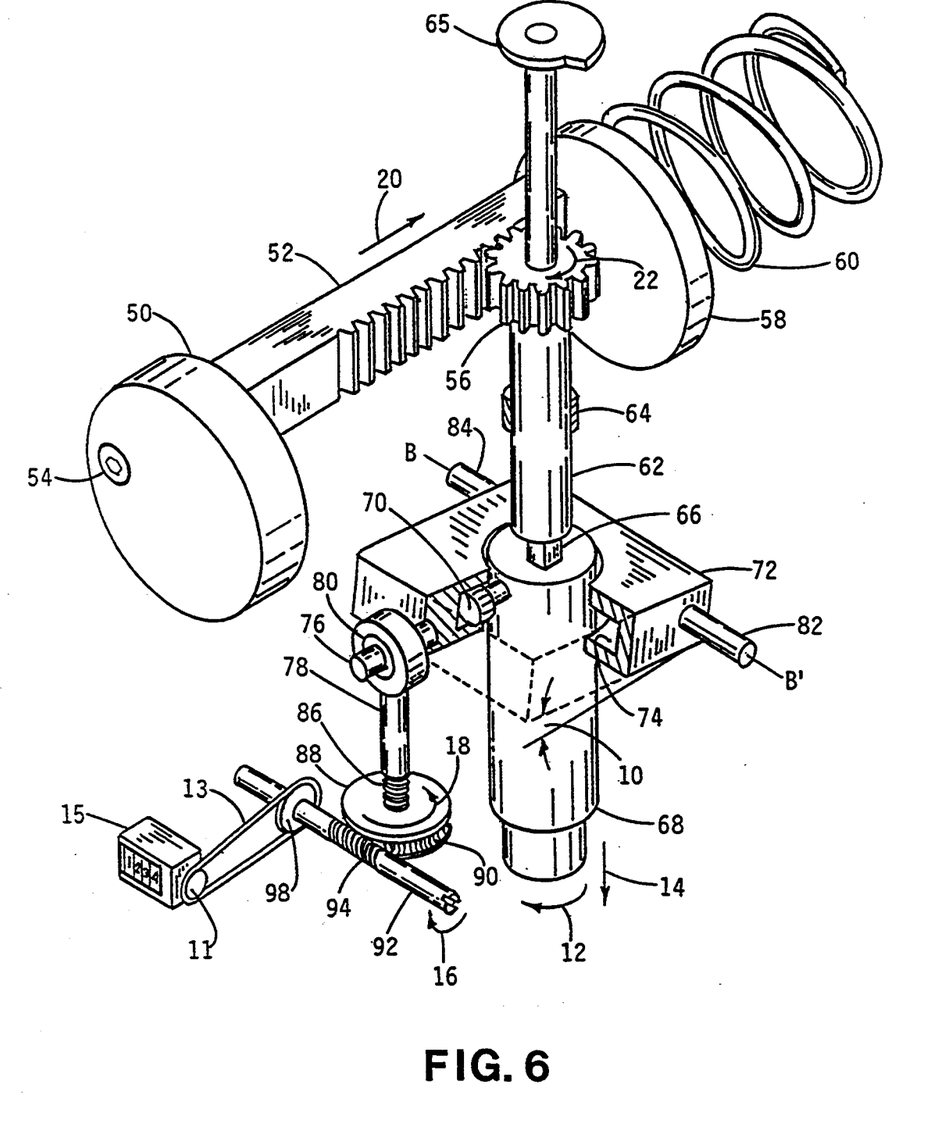
FIG. 6 is an isometric view of another embodiment of the internal mechanisms of a valve actuator.

FIG. 6 is a perspective view of an alternate embodiment of valve actuator 200 without the housing.

A piston 50 operates in a housing (not shown) with a rack gear 52 rigidly attached to a piston 50 by a cap screw 54. The opposite end of the rack gear 52 has a cylindrical extension that inserts with a close fit into a hole in a spring seat 58. The spring seat 58 is engaged on its opposite end by spring 60. The spring 60 engages a spring seat (not shown) at the second end of the housing (not shown). When assembled as described, the piston 50, rack gear 52, and spring seat 58 move as a unit biased into the first end of the housing (not shown).

The rack gear 52 is engaged by a pinion gear 56. The pinion gear 56 is coaxial with and rigidly attached to a pinion shaft 62. The pinion shaft 62 operates in a journal bearing 64 below the pinion gear 56. The pinion shaft has a position feedback cam 65 on the upper end which engages a cam follower assembly of a valve positioner. Valve positioners utilizing motion feedback mechanisms are well-known in the art. A motion feedback positioner manufactured by Foxboro could be incorporated into this embodiment.

The pinion shaft 62 has a square extension 66 on the lower end which fits closely into a square recess in the top of the stem connector 68. A cam follower 70 is rigidly attached near the upper end of the stem connector 68. The centerline of the cam follower 70 is perpendicular to the centerline of the stem connector 68. The outer surface of the cam follower 70 is spherical, to permit point contact with a mating cam surface.

The stem connector 68 translates through a central hole in a rectangular swash plate 72. The central hole in the swash plate 72 is large enough to provide generous clearance around the stem connector 68. Two stub shafts, 82 and 84, are rigidly attached to opposite sides of the swash plate 72. A centerline B—B' is coincident with the centerlines of the stub shafts 82 and 84. The stub shafts 82 and 84 fit closely into respective journal bearings (not shown) so that the swash plate 72 can pivot around centerline B—B'.

A pin 76 is rigidly attached to a first end of swash plate 72. A centerline of the pin 76 is perpendicular to centerline B—B'.

A precision annular groove 74 is machined on the inner diameter of the swash plate 72 adjacent stem connector 68. The cross section of the groove 74 is essentially square and the upper and lower surfaces of the groove 74 are highly finished. The gap between the upper and lower surfaces is held to a very close tolerance so that there is a close fit with the outside diameter of the cam follower 70.

A rod end assembly 78 fits closely over the pin 76. The part of the rod end assembly 78 that fits over the pin has a spherical outer diameter called a spherical journal 80. The spherical journal 80 permits angular changes of around +/−25 degrees about its spherical center.

The rod end assembly 78 has an integral shaft extending down with a right-hand male thread 86. The male thread 86 engages a female thread in the screw gear 88 below pin 76.

An adjusting screw 92 with an ordinary vee thread 94 engages a partial vee thread 90 on the periphery of the screw gear 88. The screw 92 and the screw gear 88 operate together as a worm and worm gear.

A pulley 98 is attached to the adjusting screw 92 and rotates when the screw shaft 92 is rotated. Another pulley 11 is attached to a parallel shaft of a numerical counter 15. A flexible elastomeric belt 13 is lightly stretched over pulleys 98 and 11. When the adjusting screw shaft 92 is rotated, the number displayed on the counter 15 is increased or decreased depending on the direction of rotation.

The adjusting screw 92 may be rotated with an ordinary screwdriver with very little effort. When the adjusting screw 92 is rotated clockwise as indicated by the arrow 16, the screw gear 88 rotates counter-clockwise as shown by the arrow 18. The rotation of the screw gear 88 pulls the rod end assembly 78 downward. As the rod end assembly 78 moves downward, it causes the swash plate 72 to rotate about centerline B—B', which decreases the subtended angle 10. The clockwise rotation of the adjusting screw 92 also causes the number displayed on the counter 15 to decrease. When the subtended angle 10 is zero degrees, the counter 15 display will read zero.

The movement of the piston in the direction indicated by the arrow 20 makes the pinion gear 56 rotate clockwise, as indicated by the arrow 22. The rotational motion is transmitted to the stem connector 68 by the square 66 on the lower end of the pinion shaft 62. As the stem connector 68 rotates, the cam follower 70 follows the annular groove 74. If the swash plate angle 10 is greater than zero degrees, the cam follower 70 will follow the inclination of the groove and the stem connector 68 will move downward as indicated by the arrow 14 as it rotates, as indicated by the arrow 12.

The mechanism must be arranged and designed so that the rotation of the stem connector 68 is less than 180 degrees. This can be readily accomplished by providing limits to the stroke of the piston 50 and a correct size selection of pinion gear 56 relative to the stroke of the piston 50.

The swash plate angle 10 may be changed at any time to provide the desired motion 14 of the stem connector 68. The adjusting screw 92 provides a means of very precise adjustments to the angle 10. As the desired adjustment is made, the counter 15 will display a value that represents the maximum Cv of the plug-and-orifice combination when the piston has traveled to the 100% position.

FIG. 6 shows the arrangement of rack gear 52, pinion gear 56 and cam follower bearing 70 which provides a fail-open mode in the event of air failure. To provide a fail-close mode, the actuator 200 must be partially disassembled. The piston 50 and rack gear 52 assembly must be moved axially to the left until the rack gear disengages from the pinion gear 56. The stem connector 68 must be manually rotated 180 degrees so that the cam follower 70 is 180 degrees from the position shown in FIG. 6.

After rotating the stem connector 68 180 degrees, the piston 50 and rack gear 52 assembly can be reinstalled to their original positions. Thus, the rack gear 52 will engage the pinion gear 56 as shown. However, the cam follower 70 will now be operating in a section of the annular groove 74 of the swash plate 72 that is closest to stub shaft 82. As air pressure is applied to the piston 50, the cam follower 70 is caused to move upward by the slope of the annular groove 74 in the swash plate 72. If there is an air failure, the spring 60 will push the piston 50 to an extreme left position and the stem connector 68 will move downward.

Although particular detailed embodiments of the apparatus have been described herein, it should be understood that the invention is not restricted to the details of the preferred embodiment. Many changes in design, configuration, and dimensions are possible without departing from the spirit and scope of the invention.

What is claimed is:

1. An actuator for controlling the opening of a flow control valve in response to signals indicative of desired flow rate through the valve, comprising:

a drive member operable in response to such signals to generate movement as a function of the magnitude of the signals wherein the drive member comprises a piston of a piston and cylinder assembly;

a first linkage comprising a first cam and coupling the drive member to the valve so as to vary opening of the valve over a range of openings as a function of changes in magnitude of said movement; and a second linkage comprising a second cam and operable to displace the first linkage relative to the valve while maintaining coupling of the drive member and the valve so as to change the range of openings of the valve in response to the magnitude of said movement.

2. An actuator for controlling the opening of a flow control valve in response to signals indicative of desired flow rate through the valve, comprising:

a drive member operable in response to such signals to generate movement as a function of the magnitude of the signals wherein the drive member comprises a piston of a piston and cylinder assembly;

a first linkage coupling the drive member to the valve so as to vary opening of the valve over a range of openings as a function of changes in magnitude of said movement; and a second linkage operable to displace the first linkage relative to the valve while maintaining coupling of the drive member and the valve so as to change the range of openings of the valve in response to the magnitude of said movement; and wherein the drive member comprises a rack and pinion gear assembly coupling the drive member to the valve with the rack adapted to move with the drive member and the pinion adapted to translate movement of the rack to relative movement between the first linkage and the valve.

3. Apparatus for changing the flow control range of a valve which comprises:

a piston and cylinder assembly wherein the piston is displaceable along the axis of the cylinder from a first axial position to a second axial position;

a first linkage coupling the piston and the valve such that movement of the piston along the axis of the cylinder causes the valve to experience a first range of openings corresponding to axial positions of the piston between said first and second axial positions, the first linkage comprising:

rack and pinion gearing adapted to translate axial movement of the piston into rotational movement of the pinion gear;

a pinion shaft rotatable with the pinion gear;

a connector coupling the pinion shaft with the stem of the valve in co-rotatable, axially movable relation;

a variable angle swash plate bearing positioned around the connector; and a cam follower adapted to follow the swash plate and move the valve stem so as to cause the valve to experience said first range of valve openings; and a second linkage operable to change the range of openings of the valve corresponding to said axial positions from said first range of valve openings.

4. The apparatus of claim 3 wherein the second linkage comprises means operable to change the angle of the swash plate.

5. The apparatus of claim 3 wherein the connector has an extreme extended position relative to the axis of the cylinder which position remains unchanged by operation of the second linkage to change the range of openings of the valve.

6. The apparatus of claim 4 wherein the connector has an extreme extended position relative to the axis of the cylinder which position remains unchanged by operation of the second linkage to change the range of openings of the valve.

7. The apparatus of claim 3 wherein the second linkage comprises stepless incremental adjusting means.

8. The apparatus of claim 7 wherein the second linkage comprises means operable to change the angle of the swash plate.

9. The apparatus of claim 7 wherein the connector has an extreme extended position relative to the axis of the cylinder which position remains unchanged by operation of the second linkage to change the range of openings of the valve.

10. The apparatus of claim 8 wherein the connector has an extreme extended position relative to the axis of the cylinder which position remains unchanged by operation of the second linkage to change the range of openings of the valve.

11. An actuator for controlling the opening of a flow control valve in response to signals indicative of desired flow rate through the valve, comprising:

a drive member operable in response to such signals to generate movement as a function of the magnitude of the signals;

a first linkage comprising a first cam and coupling the drive member to the valve so as to vary opening of the valve over a range of openings as a function of changes in magnitude of said movement; and a second linkage comprising a second cam and operable to displace the first linkage relative to the valve while maintaining coupling of the drive member and the valve so as to change the range of openings of the valve in response to the magnitude of said movement.

12. The apparatus of claim 11 wherein said drive member is capable of providing rotation of the first linkage.

13. An actuator for controlling the opening of a flow control valve in response to signals indicative of desired flow rate through the valve, comprising:

a drive member operable in response to such signals to generate movement as a function of the magnitude of the signals;

a first linkage coupling the drive member to the valve so as to vary opening of the valve over a range of openings as a function of changes in magnitude of said movement;

a second linkage operable to displace the first linkage relative to the valve while maintaining coupling of the drive member and the valve so as to change the range of openings of the valve in response to the magnitude of said movement; and wherein the drive member comprises a rack and pinion gear assembly coupling the drive member to the valve with the rack adapted to move with the drive member and the pinion adapted to translate movement of the rack to relative movement between the first linkage and the valve.

* * * * *

UNITED STATES PATENT AND TRADEMARK OFFICE
CERTIFICATE OF CORRECTION

PATENT NO. : 5,411,239

DATED : May 2, 1995

INVENTOR(S) : Erling A. Sorensen

It is certified that error appears in the above-indentified patent and that said Letters Patent is hereby corrected as shown below:

Column 5, line 40, after "section" insert --136. The transmitted force acts through teh diaphragm --.

Signed and Sealed this

Eighth Day of August, 1995

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,411,239

DATED : May 2, 1995

INVENTOR(S) : Erling A. Sorensen

It is certified that error appears in the above-indentified patent and that said Letters Patent is hereby corrected as shown below:

On the title page, item [75] Inventor: "Searook, Tex." should be --Seabrook, Tex.--.

Signed and Sealed this

Seventeenth Day of October, 1995

*Attest:*

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,411,239
DATED : May 2, 1995
INVENTOR(S) : Erling A. Sorensen

It is certified that error appears in the above-indentified patent and that said Letters Patent is hereby corrected as shown below:

Column 5, line 40, after "section" insert --136. The transmitted force acts through the diaphragm --.

This certificate supercedes Certificate of Correction issued August 8, 1995.

Signed and Sealed this

Second Day of April, 1996

Attest:

BRUCE LEHMAN

Attesting Officer     Commissioner of Patents and Trademarks